United States Patent
Matsumae et al.

(10) Patent No.: US 8,994,972 B2
(45) Date of Patent: Mar. 31, 2015

(54) PRINTING SYSTEM AND METHOD FOR OBTAINING A DESIRED OR AN ALTERNATIVE PULL-PRINTING RESULT

(71) Applicant: KYOCERA Document Solutions Inc., Osaka (JP)

(72) Inventors: Keisaku Matsumae, Osaka (JP); Daisuke Yoshida, Osaka (JP); Ryusuke Nakatani, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 13/927,511

(22) Filed: Jun. 26, 2013

(65) Prior Publication Data
US 2014/0002848 A1 Jan. 2, 2014

(30) Foreign Application Priority Data
Jun. 27, 2012 (JP) .................. 2012-144820

(51) Int. Cl.
 G06K 15/00 (2006.01)
 H04N 1/60 (2006.01)
 G06F 3/12 (2006.01)
(52) U.S. Cl.
 CPC ............ *G06F 3/1238* (2013.01); *G06F 3/1206* (2013.01); *G06F 3/1222* (2013.01); *G06F 3/1232* (2013.01); *G06F 3/1247* (2013.01); *G06F 3/1267* (2013.01); *G06F 3/1288* (2013.01)
 USPC .......... 358/1.13; 358/1.15; 358/1.16; 358/1.9; 358/2.1; 358/537; 358/538; 358/1.1; 709/203
(58) Field of Classification Search
 CPC ... G06F 3/1205; G06F 3/1207; G06F 3/1208; G06F 3/126; G06F 3/1255; G06F 3/1259; G06F 3/1288; G06F 3/1271; G06F 3/1297; H04N 1/32459
 USPC .......... 358/1.9, 2.1, 1.11–1.18, 400–404, 537, 358/538; 709/216, 217, 227, 203
 See application file for complete search history.

(56) References Cited

U.S. PATENT DOCUMENTS

| | | | | |
|---|---|---|---|---|
| 5,898,819 | A * | 4/1999 | Austin et al. ................. | 358/1.9 |
| 2002/0135797 | A1* | 9/2002 | Al-Kazily et al. ............ | 358/1.15 |
| 2003/0084114 | A1* | 5/2003 | Simpson et al. .............. | 709/216 |
| 2003/0234948 | A1* | 12/2003 | Sasaki .......................... | 358/1.13 |
| 2008/0259390 | A1* | 10/2008 | Murase ......................... | 358/1.15 |
| 2011/0188072 | A1* | 8/2011 | Ikeda ............................ | 358/1.15 |

FOREIGN PATENT DOCUMENTS

| | | |
|---|---|---|
| JP | 2000-112687 | 4/2000 |
| JP | 2008152726 A * | 7/2008 |

* cited by examiner

*Primary Examiner* — Chad Dickerson
(74) *Attorney, Agent, or Firm* — McDonnell Boehnen Hulbert & Berghoff LLP

(57) ABSTRACT

A printing system includes an image forming apparatus, a management server, and a print data transmission apparatus, each of which are coupled one another via a network. The print transmission apparatus transmits print data to the management server in association with a user. The image forming apparatus, including apparatus-supported setting data, (i) causes the management server to authenticate the user, and (ii) prints the print data. The management server (i) manages the print data transmitted from the print data transmission apparatus, (ii) performs authentication of the user, and changes the print data associated with the user to supported print data corresponding to the apparatus-supported setting data, and (iii) transmits the supported print data to the image forming apparatus, if the authentication of the user is successful.

15 Claims, 14 Drawing Sheets

27b APPARATUS-SUPPORTED SETTING TABLE

| APPARATUS SETTING | | SUPPORT STATUS |
|---|---|---|
| THE NUMBER OF COPIES | | SUPPORTED |
| SHEET SIZE INFORMATION | A4 | SUPPORTED |
| | A3 | SUPPORTED |
| | ⋮ | ⋮ |
| COLOR/BLACK INFORMATION | MONOCHROME | SUPPORTED |
| | COLOR | SUPPORTED |
| ⋮ | | ⋮ |

FIG. 3

PRINTING SYSTEM AND METHOD FOR OBTAINING A DESIRED OR AN ALTERNATIVE PULL-PRINTING RESULT

INCORPORATION BY REFERENCE

This application is based upon, and claims the benefit of priority from, corresponding Japanese Patent Application No. 2012-144820, filed in the Japan Patent Office on Jun. 27, 2012, the entire contents of which is incorporated herein by reference.

FIELD

The present disclosure relates to printing systems that include an image forming apparatus, a management server that manages users of the image forming apparatus, and a print data transmission apparatus that transmits, to the management server, print data for printing to be performed by the image forming apparatus in association with specified users, and related printing methods.

BACKGROUND

An example of a typical print management technique is "pull printing" in which a printer outputs images based on document information obtained directly from a server without using a host system.

A typical printing system performing pull printing includes an image forming apparatus, a management server that manages users of the image forming apparatus, and a print data transmission apparatus that transmits, to the management server, print data for printing performed by the image forming apparatus in association with specified users. The image forming apparatus of the printing system includes an authentication request unit that sends the management server a request for authentication of a user, and a print execution unit that performs printing based on print data transmitted from the management server. The management server of the printing system includes a print data management unit that manages print data transmitted from the print data transmission apparatus, an authentication execution unit that performs authentication of the user based on the request for authentication, and a print data transmission unit that transmits, to an image forming apparatus that requested the authentication, print data that is included in the print data managed by the print data management unit and that is associated with the user who has been successfully authenticated by the authentication execution unit.

In this printing system, after the user who wants to perform pull printing has sent a request for authentication from the image forming apparatus to the management server and has been successfully authenticated by the management server, the image forming apparatus prints based on print data that is managed by the management server and that is associated with the user who has been successfully authenticated by the management server. Hence, the likelihood of someone else taking the printed output is decreased.

Further, when the user performs pull printing in this printing system, printing is performed at any image forming apparatus from among a plurality of image forming apparatuses included in this printing system. For example, the user who wants to perform pull printing can cause pull printing be performed at any image forming apparatus that is not being used by other users. A user who performs pull printing can cause pull printing be performed at image forming apparatuses that do not have a paper jam or a shortage of expendable supplies from among the plurality of image forming apparatuses included in the printing system.

However, in the printing system described above, when the print data transmitted from the management server to an image forming apparatus is not supported by the image forming apparatus, the image data is not processed properly in the image forming apparatus. Hence, in some cases, printing may not be performed or a desired print result may not be obtained.

SUMMARY

The present disclosure relates to a printing system and a printing method that can realize, in pull printing, a print result that is desired by a user or an alternative print result.

A printing system according to an embodiment of the present disclosure includes an image forming apparatus, a management server, and a print data transmission apparatus, each of which are coupled to a network. The print data transmission apparatus includes a first print data transmission unit configured to transmit print data associated with a user to the management server. The image forming apparatus includes an authentication request unit configured to cause the management server to authenticate the user, and a print execution unit, including apparatus-supported setting data, configured to print the print data transmitted from the management server. The management server includes a print data management unit configured to manage the print data transmitted from the print data transmission apparatus, an authentication execution unit configured to authenticate the user, and a second print data transmission unit configured to change the print data associated with the user to supported print data corresponding to the apparatus-supported setting data, and transmit the supported print data to the image forming apparatus, if authentication of the user is successful.

A method of printing according to an embodiment of the present disclosure is performed by a printing system that includes an image forming apparatus, a management server, and a print data transmission apparatus, each of which are coupled to a network. The method includes, via the print data transmission apparatus, transmitting print data associated with a user to the management server; via the image forming apparatus including apparatus-supported setting data, causing the management server to authenticate the user, and printing the print data transmitted from the management server; via the management server, managing the print data transmitted from the print data transmission apparatus, performing authentication of the user, changing, if the authentication of the user is successful, the print data associated with the user to supported print data corresponding to the apparatus-supported setting data, and transmitting the supported print data to the image forming apparatus.

Additional features and advantages are described herein, and will be apparent from the following Detailed Description and the figures.

BRIEF DESCRIPTION OF FIGURES

In the accompanying drawings:

FIG. 3 is a schematic diagram illustrating an example apparatus-supported setting table of the MFP illustrated in FIG. 2;

DETAILED DESCRIPTION

Figure 1:
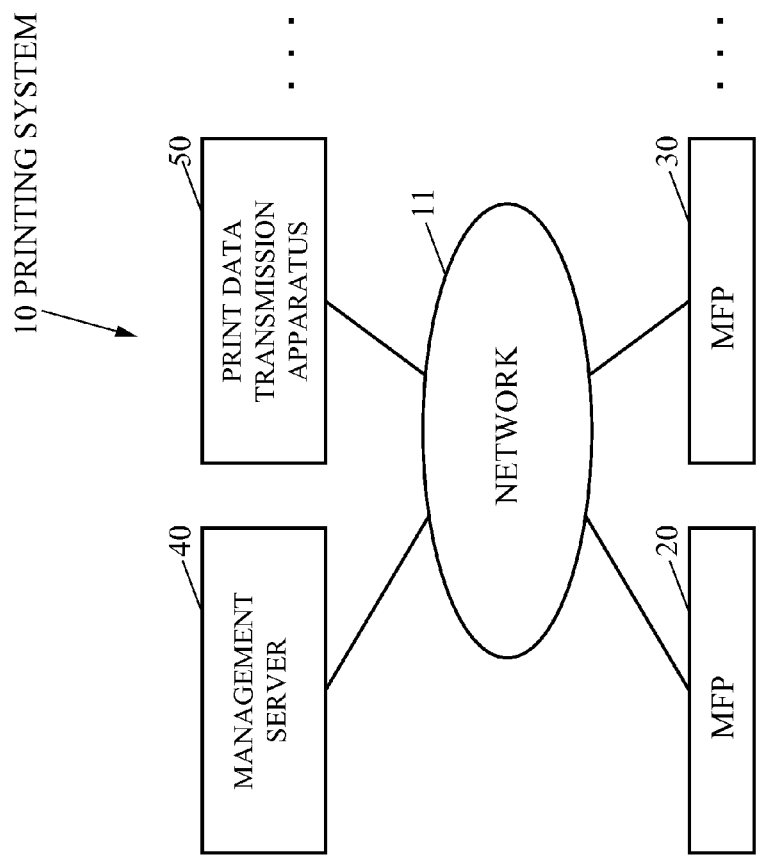
FIG. 1 is a block diagram illustrating the configuration of a printing system according to an embodiment of the present disclosure.

FIG. 1 is a block diagram illustrating the configuration of a printing system 10 according to an embodiment of the present disclosure.

The printing system 10 includes a plurality of multifunction peripherals (MFPs) including an MFP 20 and an MFP 30, a management server 40 that manages users of the MFPs, and a plurality of print data transmission apparatuses, including a print data transmission apparatus 50, that transmit print data associated with specific users to the management server 40 for printing by the MFPs. The plurality of the MFPs, the management server 40, and the plurality of print data transmission apparatuses are connected to one another in such a manner as to be able to communicate with one another via a network 11, such as a local area network (LAN) or the Internet. The image forming apparatuses of the present disclosure includes the plurality of the MFPs.

The plurality of the MFPs included in the printing system 10 have the same configuration as the MFP 20 or the MFP 30. Hereinafter the MFP 20 and the MFP 30 will be described.

Similarly, the plurality of the print data transmission apparatuses included in the printing system 10 have the same configuration as the print data transmission apparatus 50. Hereinafter, the print data transmission apparatus 50 will be described.

Figure 2:
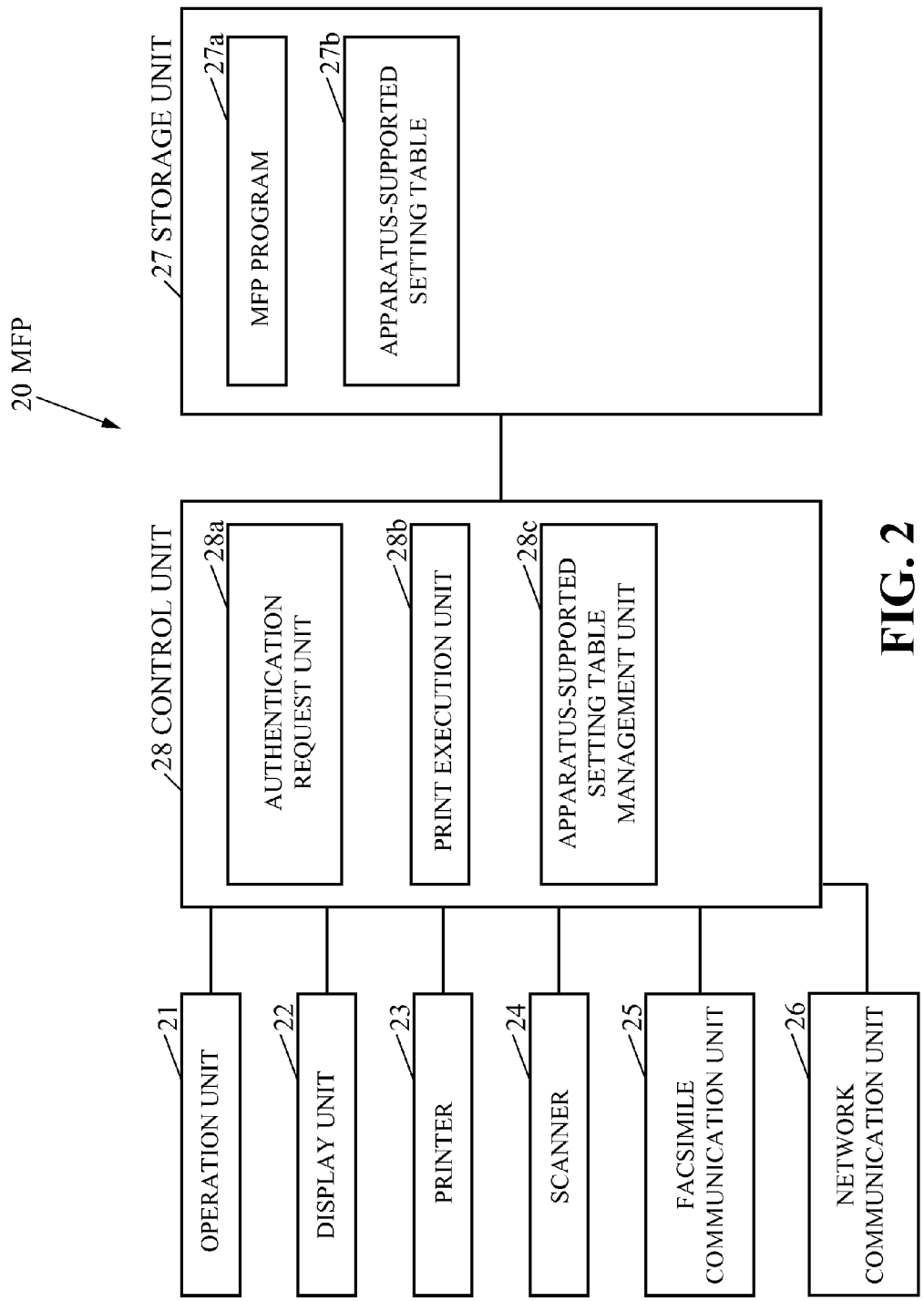
FIG. 2 is a block diagram illustrating the configuration of a multifunction peripheral (MFP) in the printing system.

FIG. 2 is a block diagram illustrating the configuration of the MFP 20.

The MFP 20 includes an operation unit 21, a display unit 22, a printer 23, a scanner 24, a facsimile communication unit 25, a network communication unit 26, a storage unit 27, and a control unit 28. The operation unit 21 is an input device including, for example, buttons, for receiving various user operations performed thereon. The display unit 22 is a display device, such as a liquid crystal display (LCD), for displaying various types of information. The printer 23 is a printing device for printing on a sheet of paper. The scanner 24 is a reading device for reading an image from an original document. The facsimile communication unit 25 is a facsimile device for communicating with an external facsimile device (not illustrated) via a communication line, such as a public telephone network. The network communication unit 26 is a network communication device for communicating with external apparatuses via the network 11. The storage unit 27 is a storage device, such as a hard disk drive (HDD), for storing various types of information. The control unit 28 controls the entirety of the MFP 20.

The storage unit 27 stores an MFP program 27a, which is a program for the MFP, and an apparatus-supported setting table 27b, which contains the apparatus settings data supported by a print execution unit 28b described later.

The MFP program 27a may be installed in the MFP 20 at the manufacturing stage of the MFP 20 or may be additionally installed in the MFP 20 from a storage medium, such as an SD card or a universal serial bus (USB) memory stick. Alternatively, the MFP program 27a may be additionally installed in the MFP 20 from the network 11.

FIG. 3 is a schematic diagram illustrating an example of the apparatus-supported setting table 27b.

The apparatus-supported setting table 27b stores the apparatus settings data and the support statuses for the apparatus settings.

The apparatus-supported setting table 27b shows that the MFP 20 supports an option for indicating a number of printed copies in the print attribute information of the print data. Additionally, the MFP 20 supports printing on A4- and A3-size paper by indicating the sheet size information in the print attribute information of the print data. Further, the MFP 20 supports "monochrome" and "color" printing by indicating the color/black information in the print attribute information of the print data.

The control unit 28 illustrated in FIG. 2 includes, for example, a central processing unit (CPU), a read only memory (ROM) storing programs and various data, and a random access memory (RAM) used as a work area for the CPU. The CPU executes programs stored in the ROM or the storage unit 27.

The control unit 28, by executing the MFP program 27a, functions as (i) an authentication request unit 28a which sends to the management server 40 a request for authentication of a user, (ii) the print execution unit 28b that prints based on print data transmitted from the management server 40, and (iii) an apparatus-supported setting table management unit 28c that manages the apparatus-supported setting table 27b.

Figure 4:
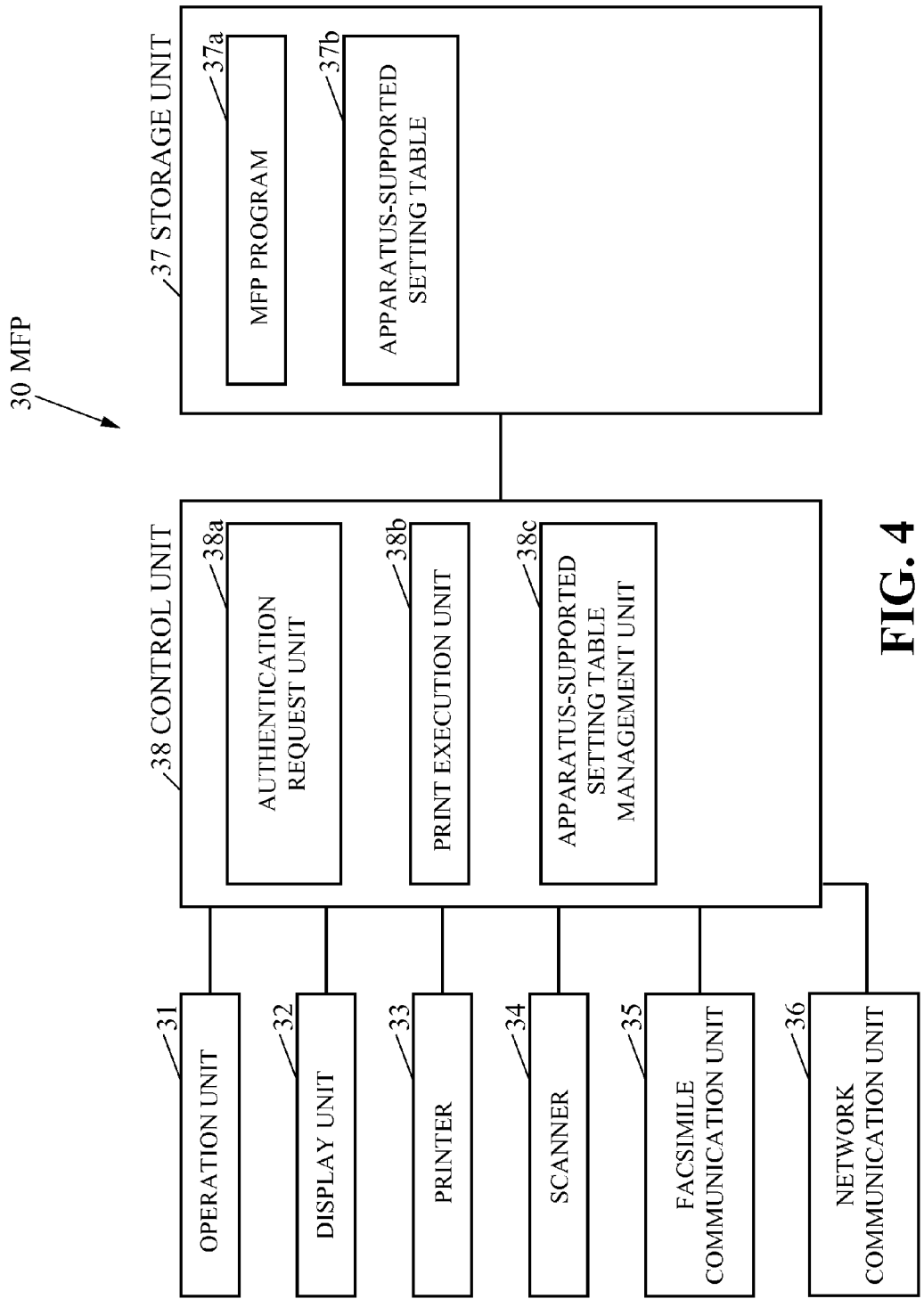
FIG. 4 is a block diagram illustrating the configuration of another MFP illustrated in FIG. 2 in the printing system.

FIG. 4 is a block diagram illustrating the configuration of the MFP 30.

The MFP 30 includes an operation unit 31, a display unit 32, a printer 33, a scanner 34, a facsimile communication unit 35, a network communication unit 36, a storage unit 37, and a control unit 38 that are respectively similar to the operation unit 21, the display unit 22, the printer 23, the scanner 24, the facsimile communication unit 25 the network communication unit 26, the storage unit 27, and the control unit 28 of the MFP 20.

However, in the present embodiment, the storage unit 37 is a memory device such as an electrically erasable programmable read only memory (EEPROM) storing various types of data and has a considerably smaller amount of storage than the storage unit 27.

The storage unit 37 stores an MFP program 37a and an apparatus-supported setting table 37b that are respectively similar to the MFP program 27a of the storage unit 27 and the apparatus-supported setting table 27b.

The control unit 38, by executing the MFP program 37a, functions as an authentication request unit 38a, a print execution unit 38b, and an apparatus-supported setting data management unit 38c that are respectively similar to the authentication request unit 28a, the print execution unit 28b, and the apparatus-supported setting table management unit 28c of the control unit 28.

Figure 5:
FIG. 5 is a schematic diagram illustrating an example apparatus-supported setting table of the MFP illustrated in FIG. 4.

FIG. 5 is a schematic diagram illustrating an example of the apparatus-supported setting table 37b.

The apparatus-supported setting table 37b stores the apparatus settings data and the support statuses for the apparatus settings.

The apparatus-supported setting table 37b illustrated in FIG. 5 shows that the MFP 30 does not support an option for indicating a number of printed copies in the print attribute information of the print data. The MFP 30 supports printing on A4-paper by indicating the sheet size information in the print attribute information of the print data, but does not support printing on A3-size paper. Further, the MFP 30 supports "monochrome" printing by indicating the color/black information in the print attribute information of the print data, but does not support "color" printing.

Note that the reason why the MFP 20, but not the MFP 30, supports the option for indicating a number of printed copies in the print attribute information of the print data is that the storage unit 37 of the MFP 30 does not have a storage capacity sufficient for temporarily storing the print data until the printing is completed, whereas the storage unit 27 of the MFP 20 has a storage capacity sufficient for temporarily storing the print data until the printing is completed.

Figure 6:
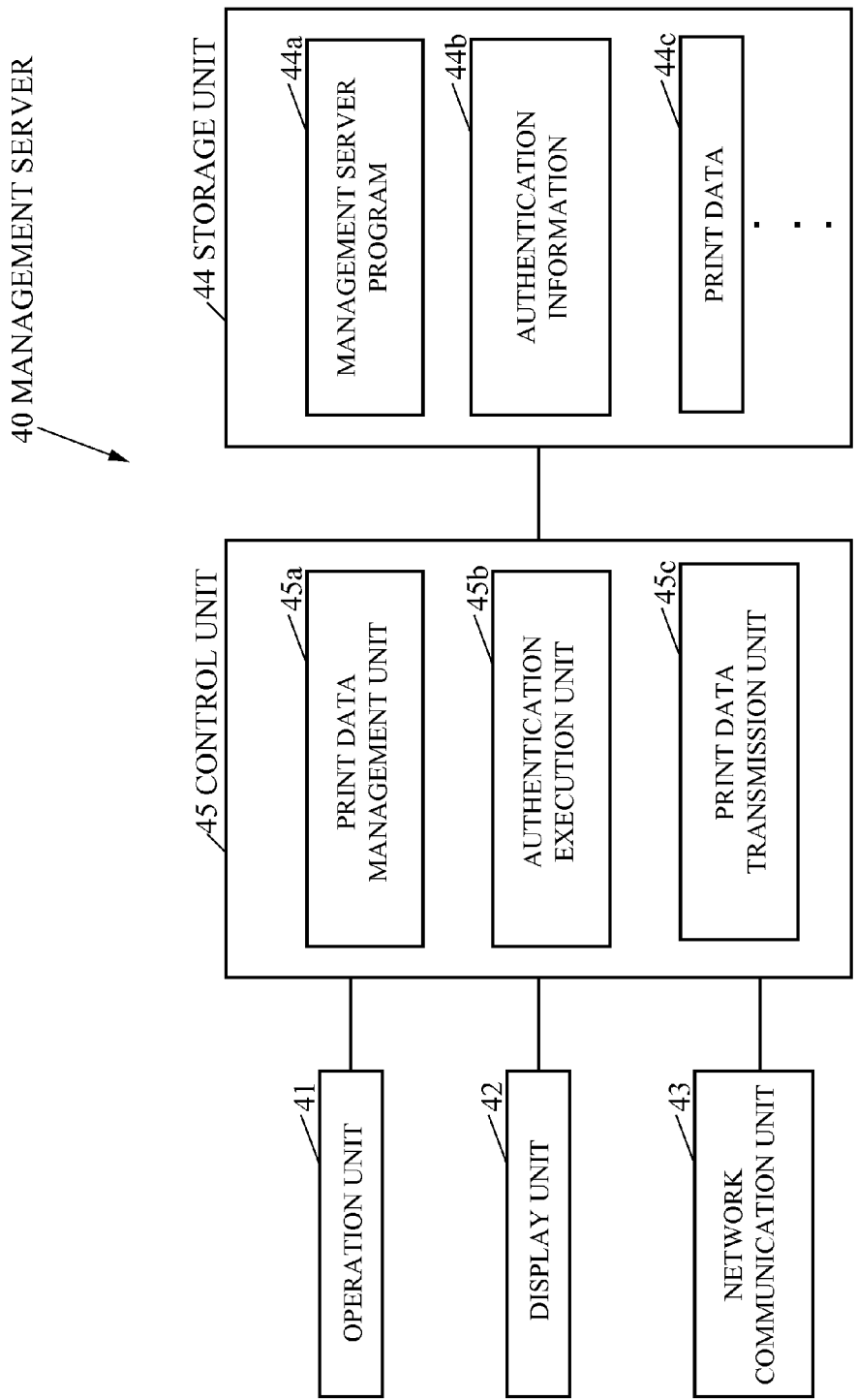
FIG. 6 is a block diagram illustrating the configuration of a management server in the printing system.

FIG. 6 is a block diagram illustrating the configuration of the management server 40.

The management server 40 includes an operation unit 41, a display unit 42, a network communication unit 43, a storage unit 44, and a control unit 45. The operation unit 41 is an input device such as a mouse or keyboard via which various types of information are input. The display unit 42 is a display device, such as an LCD, for displaying various types of information. The network communication unit 43 is a network communication device for communicating with external apparatuses via the network 11. The storage unit 44 is a storage device, such as an HDD, for storing programs and various types of data. The control unit 45 controls the entirety of the management server 40. The management server 40 takes the form of a computer such as a personal computer (PC).

The storage unit 44 stores a management server program 44a, which is a program for the management server 40, and authentication information 44b for authenticating users. The authentication information 44b contains combinations of user IDs (i.e., identification information of users) and passwords.

The management server program 44a may be installed in the management server 40 at the manufacturing stage of the management server 40 or may be additionally installed in the management server 40 from a storage medium such as a compact disk (CD) or a digital versatile disk (DVD). Alternatively, the management server program 44a may be additionally installed in the management server program 44a from the network 11.

The storage unit 44 is configured to be able to store a plurality of print jobs 44c transmitted from the print data transmission apparatus 50.

The control unit 45 includes, for example, a CPU, a ROM for storing programs and various types of data, and a RAM used as a work area for the CPU. The CPU executes the programs stored in the ROM or the storage unit 44.

The control unit 45, by executing the management server program 44a stored in the storage unit 44, functions as (i) a print data management unit 45a that manages the print jobs 44c in the storage unit 44 transmitted from the print data transmission apparatus 50, (ii) an authentication execution unit 45b that authenticates users based on requests for authentication transmitted from the MFPs or the print data transmission apparatus, and (iii) a print data transmission unit 45c that transmits a piece of print data, among the print jobs 44c, associated with the user who has been successfully authenticated to the MFP that requested the authentication.

Figure 7:
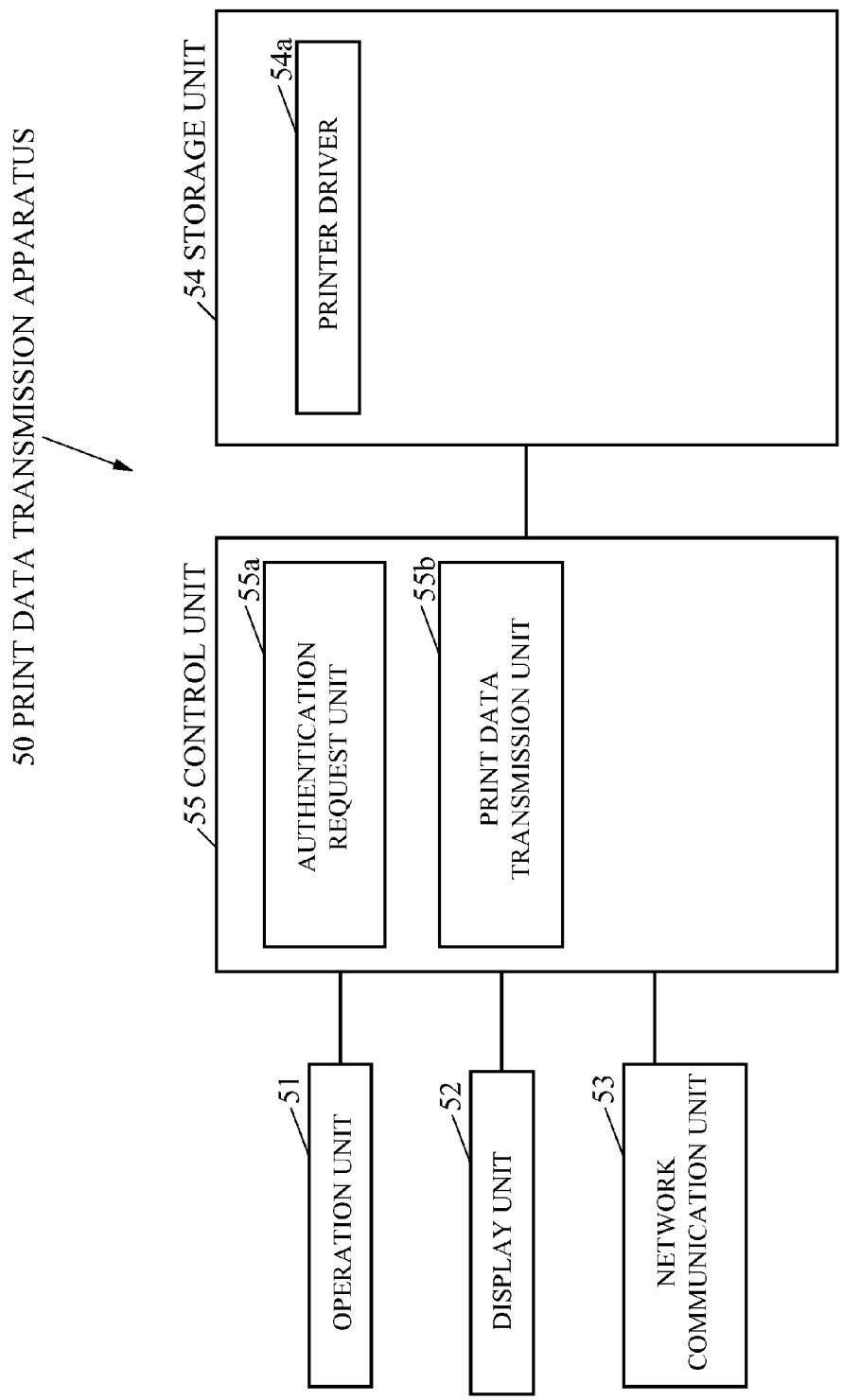
FIG. 7 is a block diagram illustrating the configuration of a print data transmission apparatus in the printing system.

FIG. 7 is a block diagram illustrating the configuration of the print data transmission apparatus 50.

The print data transmission apparatus 50 includes an operation unit 51, a display unit 52, a network communication unit 53, a storage unit 54, and a control unit 55. The operation unit 51 is an input device such as a mouse or keyboard via which various types of information are input by the user. The display unit 52 is a display device, such as an LCD, for displaying various types of information. The network communication unit 53 is a network communication device for communicating with external apparatuses via the network 11. The storage unit 54 is a storage device, such as an HDD, for storing programs and various types of data. The control unit 55 controls the entirety of the print data transmission apparatus 50. The print data transmission apparatus 50 takes the form of a computer such as a PC.

The storage unit 54 stores a printer driver 54a for generating print data based on which the MFPs perform printing.

The printer driver 54a may be installed in print data transmission apparatus 50 at the manufacturing stage of the print data transmission apparatus 50 or may be additionally installed in the print data transmission apparatus 50 from a storage medium such as a CD or a DVD. Alternatively, the printer driver 54a may be additionally installed in the print data transmission apparatus 50 from the network 11.

The control unit 55 includes, for example, a CPU, a ROM which stores programs and various types of data, and a RAM used as a work area for the CPU. The CPU executes the programs stored in the ROM or the storage unit 54.

The control unit 55, by executing the printer driver 54a stored in the storage unit 54, functions as (i) an authentication request unit 55a that issues to the management server 40 the request for authentication of the user and (ii) a print data transmission unit 55b that transmits print data.

Described next is the operation of the printing system 10 when print data is transmitted from the print data transmission apparatus 50.

A user of the print data transmission apparatus 50 can instruct the print data transmission apparatus 50 to print via the operation unit 51 in an application program such as document creation software.

Figure 8:
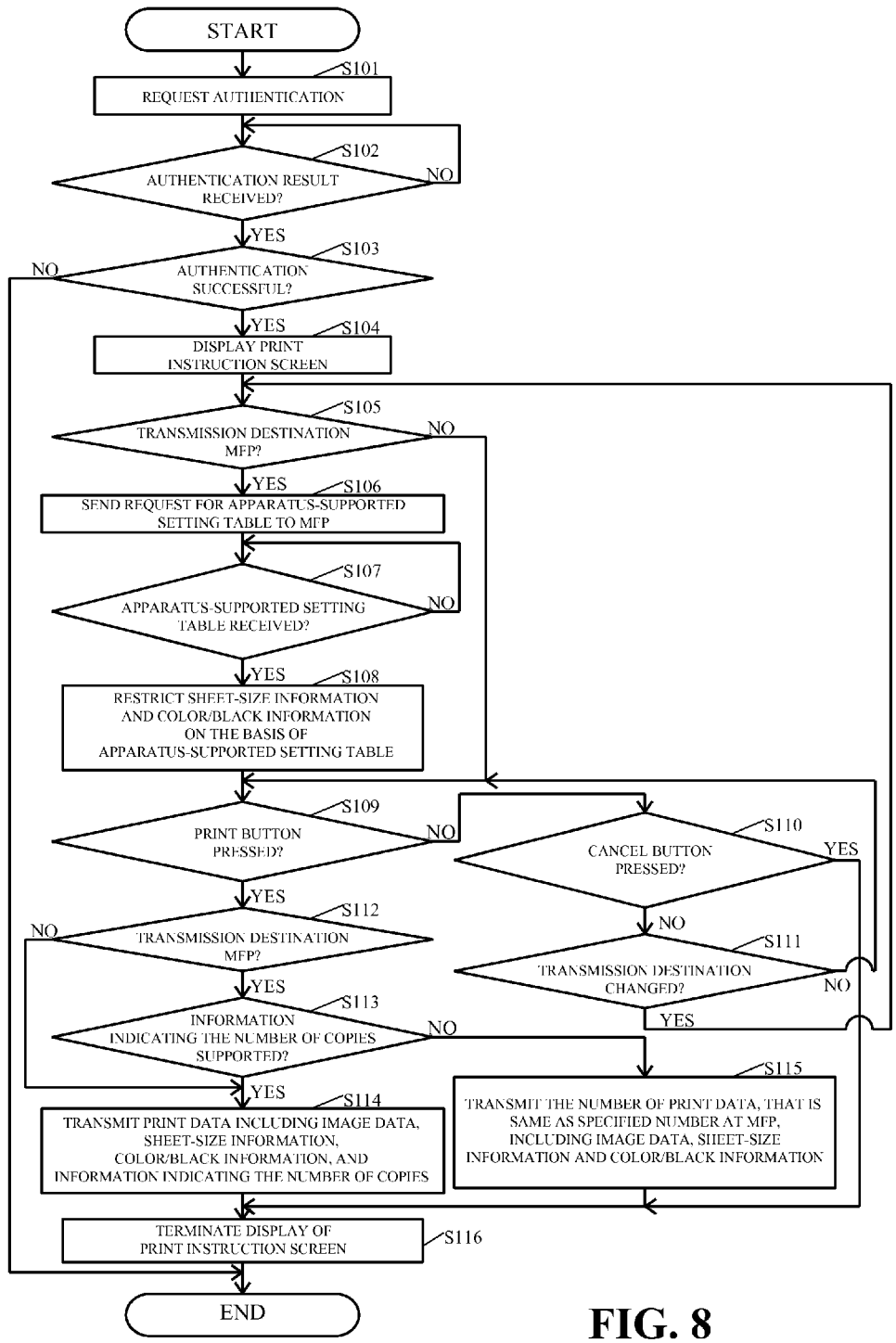
FIG. 8 is a flowchart illustrating the operation of the print data transmission apparatus at the time of execution of a printer driver.

The control unit 55 of the print data transmission apparatus 50, when instructed to print, executes the operation illustrated in FIG. 8 by activating the printer driver 54a.

FIG. 8 is a flowchart illustrating the operation of the print data transmission apparatus 50 at the time of execution of the printer driver 54a.

The authentication request unit 55a of the control unit 55 in the print data transmission apparatus 50 requests authentication of the user by transmitting the user ID and password of the current user to the management server 40 via the network communication unit 53 (S101).

The authentication execution unit 45b of the management server 40, upon receipt of the request for authentication of the user from the print data transmission apparatus 50 via the network communication unit 43, performs the requested authentication. Here, the authentication execution unit 45b determines that the authentication is successful if the combination of the user ID and password received from the print data transmission apparatus 50 is stored in the authentication information 44b. On the other hand, the authentication execution unit 45b determines that the authentication is unsuccessful if the combination of the user ID and password received from the print data transmission apparatus 50 is not stored in the authentication information 44b.

Then the authentication execution unit 45b transmits the authentication result to the print data transmission apparatus 50 via the network communication unit 43.

The authentication request unit 55a of the control unit 55 in the print data transmission apparatus 50, when the process of step S101 is finished, continues to determine whether or not the authentication result has been received from the management server 40 until it is determined that the authentication result has been received from the management server 40 via the network communication unit 53 (S102).

When it is determined in step S102 that the authentication result has been received from the management server 40, the authentication request unit 55a determines in step S102 whether or not the authentication of the user is successful based on the authentication result received from the management server 40 (S103).

The authentication request unit 55a terminates the process illustrated in FIG. 8 if it is determined in step S103 that the authentication of the user is unsuccessful.

Figure 9:
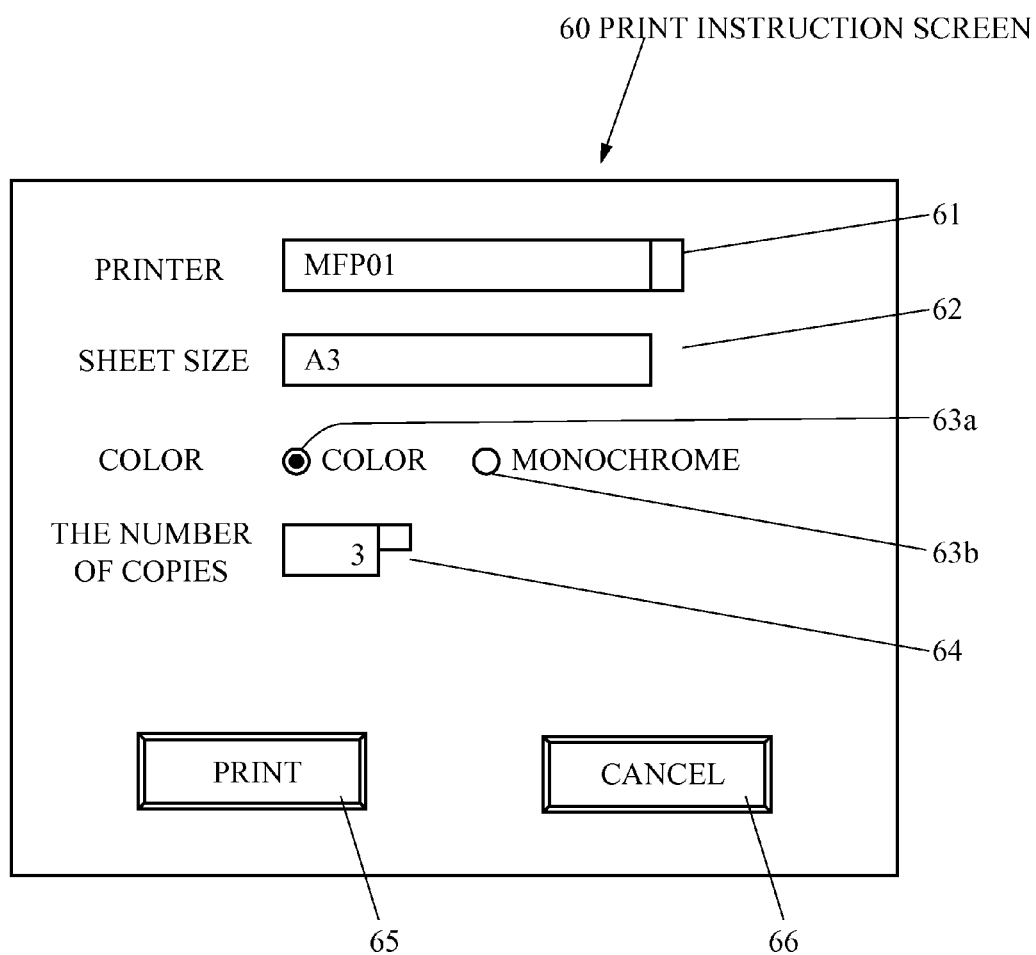
FIG. 9 is a diagram illustrating an example print instruction screen displayed on a display unit of the print data transmission apparatus.

If it is determined in step S103 that the authentication of the user is successful, the print data transmission unit 55b of the print data transmission apparatus 50 displays a print instruction screen 60 illustrated in FIG. 9 on the display unit 52 (S104).

FIG. 9 is a diagram illustrating an example of the print instruction screen 60 displayed on the display unit 52 of the print data transmission apparatus 50.

The print instruction screen 60 includes a drop-down list 61 allowing the user to select a transmission destination of print data, a drop-down list 62 allowing the user to select the size of a recording medium to which to print, i.e., a sheet size, a radio button 63a allowing the user to select "color" among the print colors, a radio button 63b allowing the user to select "monochrome" among the print colors, a spin button 64 allowing the user to select the number of copies, a print button 65 for transmitting print data, and a cancel button 66 for cancelling a print instruction.

In the drop-down list 61, it is possible to select the management server 40 other than the MFPs.

The radio button 63a and the radio button 63b are configured in such a manner that only one of them can be selected.

Referring to FIG. 8, the print data transmission unit 55b of the print data transmission apparatus 50, upon termination of the process of step S104, determines whether or not the transmission destination specified by the drop-down list 61 is an MFP (S105).

If it is determined in step S105 that the transmission destination specified by the drop-down list 61 is an MFP, the print data transmission unit 55b requests an apparatus-supported setting table from the transmission destination specified by the drop-down list 61 via the network communication unit 53 (S106).

For example, when the transmission destination specified by the drop-down list 61 is the MFP 20, the apparatus-supported setting table management unit 28c of the control unit 28 in the MFP 20, upon receipt of the request for an apparatus-supported setting table from the print data transmission apparatus 50 via the network communication unit 26, transmits the apparatus-supported setting table 27b stored in the storage unit 27 to the print data transmission apparatus 50. Although an instance has been described previously in which the transmission destination specified by the drop-down list 61 is the MFP 20, a similar process is performed if the transmission destination specified by the drop-down list 61 is an MFP other than the MFP 20—for example, the MFP 30.

The print data transmission unit 55b of the control unit 55 in the print data transmission apparatus 50, upon termination of the process of step S106, continues to determine whether or not an apparatus-supported setting table has been received via the network communication unit 53 from the MFP specified by the drop-down list 61 (S107).

When it is determined in step S107 that the apparatus-supported setting table has been received from the MFP specified by the drop-down list 61, the print data transmission unit 55b restricts the settings regarding sheet size information and color/black information based on the apparatus-supported setting table received from the MFP in step S107 (S108). For example, if the sheet size information indicates that printing to an "A3" size recording medium is not supported, then an A3-size recording medium will not be selectable in the drop-down list 62. If the color/black information indicates that "color" printing is not supported, then the print data transmission unit 55b makes the radio button 63a non-selectable.

If it is determined in step S105 that the transmission destination specified by the drop-down list 61 is not an MFP or when the process of step S108 is finished, the print data transmission unit 55b determines whether or not the print button 65 has been pressed (S109).

If it is determined in step S109 that the print button 65 has not been pressed, the print data transmission unit 55b determines whether or not the cancel button 66 has been pressed (S110).

If it is determined in step S110 that the cancel button 66 has not been pressed, the print data transmission unit 55b determines whether or not the transmission destination specified by the drop-down list 61 has been changed (S111).

If it is determined in step S111 that the transmission destination specified by the drop-down list 61 has been changed, the print data transmission unit 55b performs the process of step S105 again.

If it is determined in step S111 that the transmission destination specified by the drop-down list 61 has not been changed, the print data transmission unit 55b performs the process of step S109 again.

If it is determined in step S109 that the print button 65 has been pressed, the print data transmission unit 55b determines whether or not the transmission destination specified by the drop-down list 61 is an MFP (S112).

If it is determined in step S112 that the transmission destination specified by the drop-down list 61 is an MFP, the print data transmission unit 55b determines, based on the received apparatus-supported setting data, whether or not the MFP supports the option to indicate the number of copies (S113).

If it is determined in step S112 that the transmission destination specified by the drop-down list 61 is not an MFP, i.e., the transmission destination is the management server 40, or if it is determined in step S113 that the MFP, which is the transmission destination, supports the option to indicate the number of copies, then the print data transmission unit 55b transmits print data to the transmission destination specified by the drop-down list 61 via the network communication unit 53 (S114). The print data includes image data, sheet size information corresponding to the sheet size specified by the drop-down list 62, color/black information indicating "monochrome" or "color" printing specified by the radio button 63a and the radio button 63b, and information indicating the number of copies specified by the spin button 64. Here, when the transmission destination specified by the drop-down list 61 is the management server 40, the print data transmission unit 55b transmits the print data to the management server 40. The print data management unit 45a of the management server 40, upon receipt of the print data transmitted from the received print data transmission apparatus 50 via the network communication unit 43, stores the print data in the storage unit 44.

When it is determined in step S113 that the MFP which is the transmission destination does not support the option to indicate the number of copies, the print data transmission unit 55b transmits a number of print jobs that is equal to the number of copies specified by the spin button 64 to the MFP that is the transmission destination specified by the drop-down list 61 via the network communication unit 53 (S115). Here, the print data includes image data, sheet size information corresponding to the sheet size specified by the drop-down list 62, and color/black information indicating "monochrome" or "color" printing specified by the radio button 63a and the radio button 63b.

If it is determined in step S110 that the cancel button 66 has been pressed or when the process of step S114 or S115 has been finished, the print data transmission unit 55b terminates display of the print instruction screen 60 on the display unit 52 (S116) and terminates the process illustrated in FIG. 8.

Described next is the operation of the printing system 10 in an instance in which print data transmitted directly from the print data transmission apparatus 50 to the MFP 20 is processed by the MFP 20.

Figure 10:
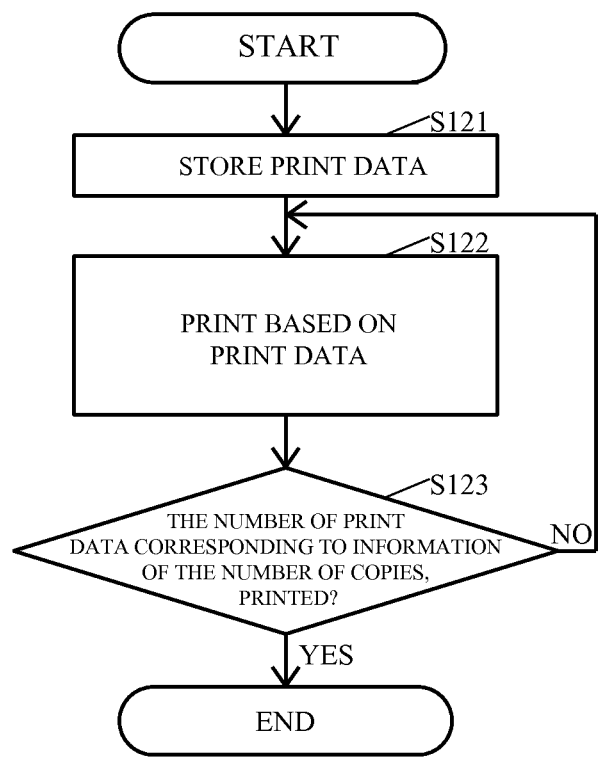
FIG. 10 is a flowchart illustrating the operation of the MFP illustrated in FIG. 2 performed when printing is performed.

The control unit 28 of the MFP 20 performs an operation illustrated in FIG. 10 upon receiving the print data transmitted from the print data transmission apparatus 50 via the network communication unit 26 in step S114.

FIG. 10 is a flowchart illustrating the operation of the MFP 20 performed when printing based on print data.

The print execution unit 28b stores print data received via the network communication unit 26 in the storage unit 27 (S121).

Then, the print execution unit 28b of the MFP 20 prints using the printer 23 based on the print data stored in the storage unit 27 in step S121 (S122).

Then, the print execution unit 28b determines whether or not the number of printed copies is the same as the number of copies indicated in the print attribute information of the print data (S123).

If it is determined in step S123 that the number of printed copies is not the same as the number of copies indicated in the print attribute information of the print data, the print execution unit 28b performs the process of step S122 again to print one more copy.

If it is determined in step S123 that the number of printed copies is the same as the number of copies indicated in the print attribute information of the print data, the print execution unit 28b terminates the process illustrated in FIG. 10.

Next, the operation of the printing system 10 will be described for the case in which print data transmitted directly from the print data transmission apparatus 50 to the MFP 30 is processed by the MFP 30.

Figure 11:
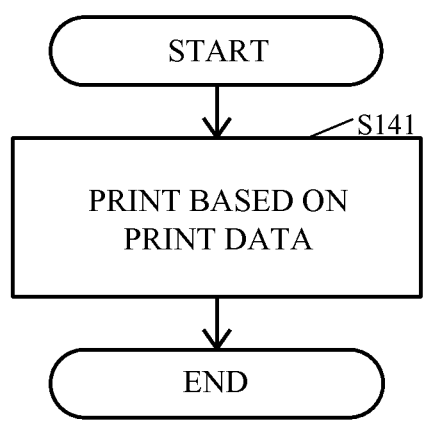
FIG. 11 is a flowchart illustrating the operation of the other MFP illustrated in FIG. 4 performed when printing is performed.

The control unit 38 of the MFP 30 performs the process illustrated in FIG. 11 upon receiving the print data transmitted from the print data transmission apparatus 50 via the network communication unit 36 in step S115.

FIG. 11 is a flowchart illustrating the operation of the MFP 30 performed when printing based on print data.

The print execution unit 38b of the control unit 38 in the MFP 30 prints using the printer 33 based on the print data received via the network communication unit 36 (S141) and terminates the process illustrated in FIG. 11.

Hence, the MFP 30, upon receipt via the network communication unit 36 of a plurality of print jobs, each including a single copy of the print data, can print a plurality of copies based on these print jobs. However, the MFP 30 can print only a single copy of each print job, even when the print data indicates a multiple number of copies for a respective job.

Described next is the operation of the printing system 10 for the case in which print data transmitted from the print data transmission apparatus 50 to the management server 40 is processed by an MFP—that is, when pull printing is performed.

As described above, print data transmitted from the print data transmission apparatus 50 to the management server 40 is stored in the storage unit 44 of the management server 40.

A user can instruct the MFP 20 to display the individual print jobs stored in the management server 40 via operation of the operation unit 21 of the MFP 20.

Figure 12:
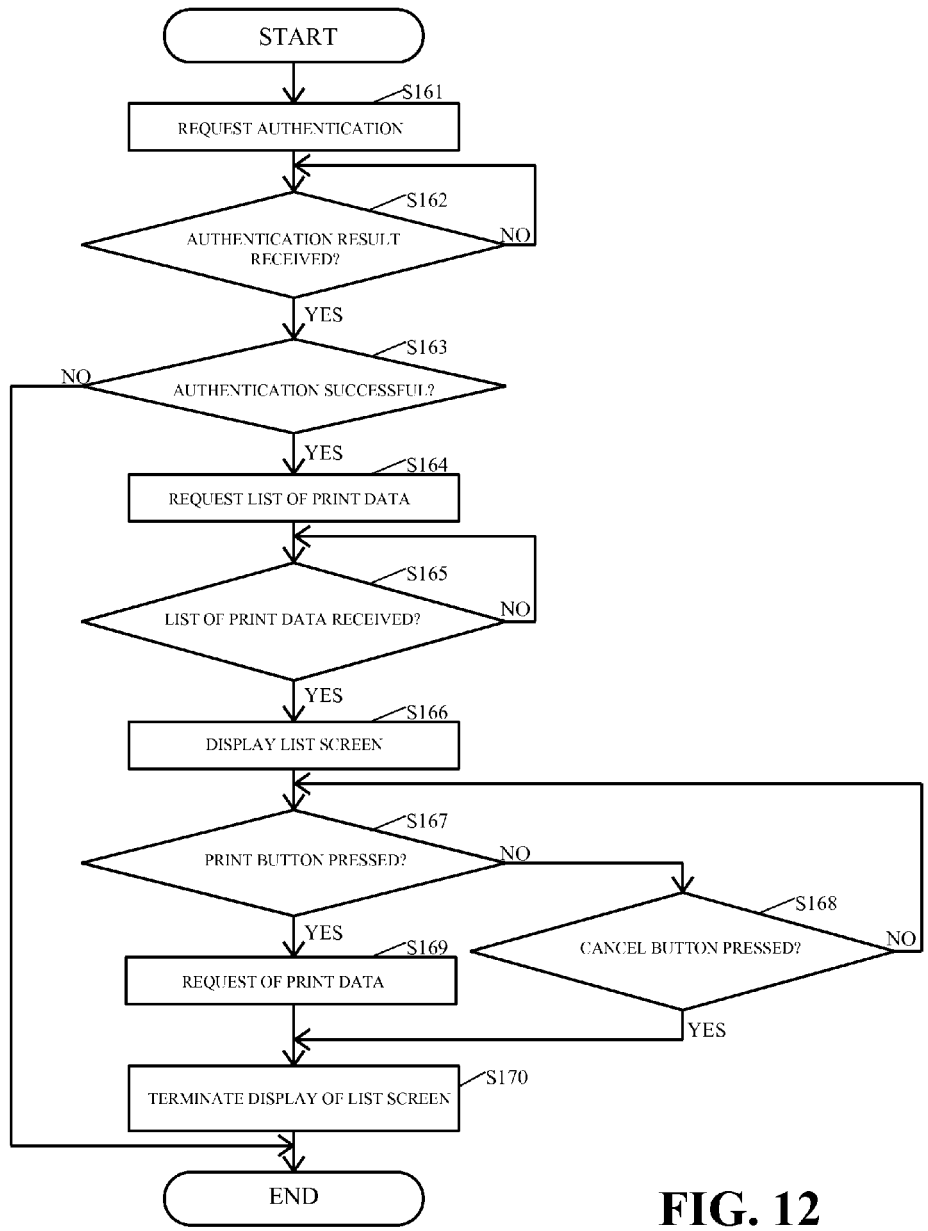
FIG. 12 is a flowchart illustrating the operation of the MFP illustrated in FIG. 2 performed when the management server is instructed to display the list of stored print jobs.

The control unit 28 of the MFP 20, upon receipt of an instruction to display the list of the print jobs stored in the management server 40, performs the process illustrated in FIG. 12.

FIG. 12 is a flowchart illustrating the operation of the MFP 20 performed when the management server 40 is instructed to display the list of print jobs stored in the management server 40.

The authentication request unit 28a of the control unit 28 in the MFP 20 requests authentication of the user by transmitting the ID and password of the current user to the management server 40 via the network communication unit 26 (S161).

The authentication execution unit 45b of the control unit 45 in the management server 40, upon receiving the request for authentication of the user from the MFP 20 via the network communication unit 43, performs the requested authentication of the user. Here, the authentication execution unit 45b determines that the authentication is successful if the combination of the user ID and password received from the MFP 20 is included in the authentication information 44b. On the other hand, the authentication execution unit 45b determines that the authentication is unsuccessful if the combination of the user ID and password received from the MFP 20 is not included in the authentication information 44b.

The authentication execution unit 45b transmits the authentication result to the MFP 20 via the network communication unit 43.

The authentication request unit 28a of the MFP 20, upon completion of the process of step S161, determines whether or not the authentication result has been received from the management server 40 (S162).

The authentication request unit 28a, if it is determined in step S162 that the authentication result has been received from the management server 40, determines whether or not the user authentication is successful or not based on the authentication result received from the management server 40 in step S162 (S163).

If it is determined in step S163 that the authentication of the user is unsuccessful, the authentication request unit 28a terminates the process illustrated in FIG. 12.

If it is determined in step S163 that the authentication of the user is successful, the print execution unit 28b of the control unit 28 in the MFP 20 requests a list of print jobs stored in the management server 40 from the management server 40 via the network communication unit 26 (S164).

The print data management unit 45a in the management server 40, upon receiving the request for the list of the print jobs from the MFP 20 via the network communication unit 43, transmits to the MFP 20 the list of the print jobs of the current user of the MFP 20 from among the print jobs 44c stored in the storage unit 44.

The print execution unit 28b of the control unit 28 in the MFP 20, upon completing the process of step S164, continues to determine whether or not the list of the print jobs has been received from the management server 40 via the network communication unit 26 (S165).

Figure 13:
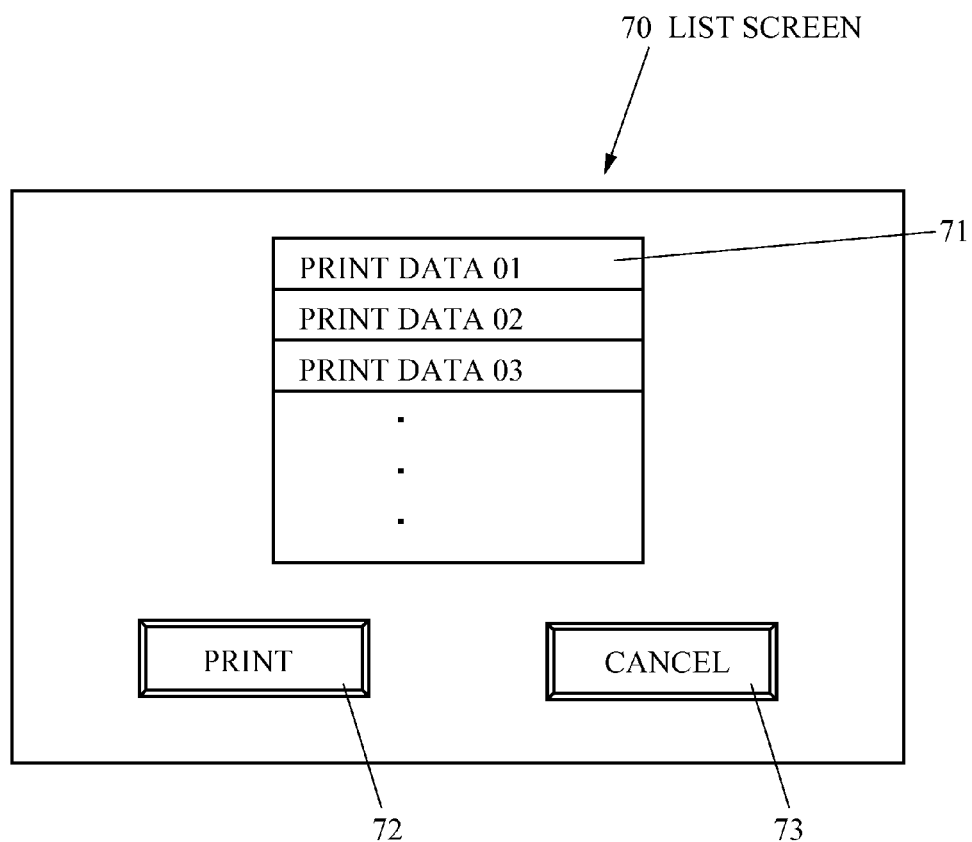
FIG. 13 is a schematic diagram illustrating an example list screen displayed on a display unit of the MFP illustrated in FIG. 2.

When it is determined in step S165 that the list of the print jobs has been received from the management server 40, the print execution unit 28b displays a list screen 70 illustrated in FIG. 13 on the display unit (S166).

FIG. 13 is a schematic diagram illustrating an example of the list screen 70 displayed on the display unit of the MFP 20.

The list screen 70 includes a list area 71 displaying the list of selectable print jobs, a print button 72 for printing based on a print job selected in the list area 71, and a cancel button 73 for cancelling a print instruction.

Referring to FIG. 12, the print execution unit 28b of the control unit 28 in the MFP 20, upon termination of the process of step S166, determines whether or not the print button 72 has been pressed (S167).

If it is determined in step S167 that the print button 72 has not been pressed, the print execution unit 28b determines whether or not the cancel button 73 has been pressed (S168).

If it is determined in step S168 that the cancel button 73 has not been pressed, the print execution unit 28b performs the process of step S167 again.

If it is determined in step S167 that the print button 72 has been pressed, the print execution unit 28b requests the print job selected in the list area 71 from the management server 40 via the network communication unit 26 (S169).

If it is determined in step S168 that the cancel button 73 has been pressed or when the process of step S169 is finished, the print execution unit 28b terminates display of the list screen 70 on the display unit (S170) and terminates the process illustrated in FIG. 12.

Although an instance is described above in which the user instructs the MFP 20 to display the list of print jobs, a similar process is performed for the case in which the user instructs an MFP, such as the MFP 30, other than the MFP 20 to display the list of print jobs.

Figure 14:
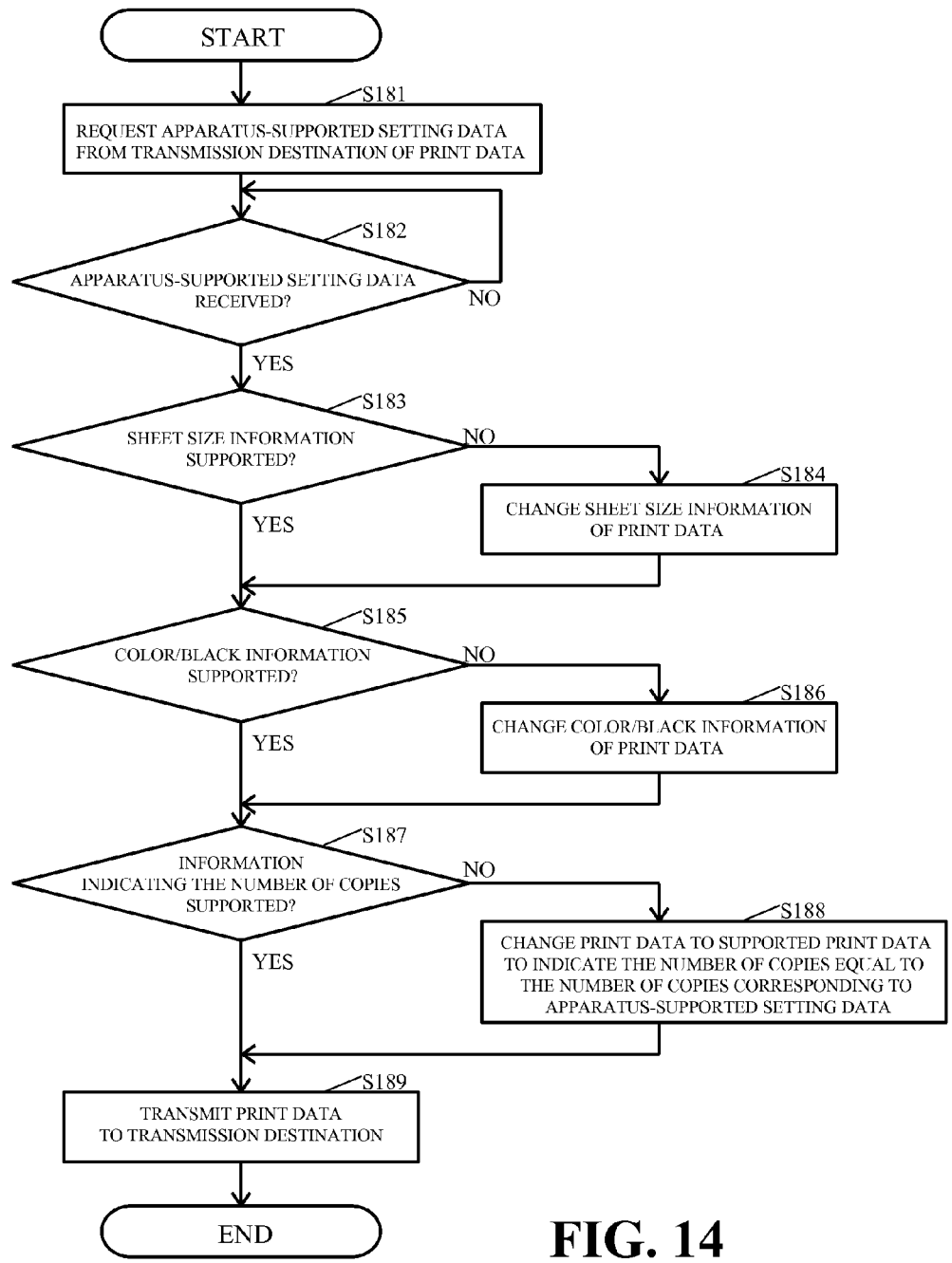
FIG. 14 is a flowchart illustrating the operation of the management server performed when print data is requested by the MFP illustrated in FIG. 2.

The management server 40, upon receipt of the request for print jobs from an MFP in step S169, performs the process illustrated in FIG. 14.

FIG. 14 is a flowchart illustrating the operation of the management server 40 performed when print jobs are requested by an MFP.

The print data transmission unit 45c in the management server 40 requests apparatus-supported setting data from the MFP that requested print data, i.e., from the transmission destination of the print data, via the network communication unit 43 (S181).

The apparatus-supported setting data management unit of the MFP that is the transmission destination of the print data, upon receiving the request for the apparatus-supported setting data from the management server 40 via the network communication unit 43 (S181), transmits the apparatus-supported setting data stored in the storage unit to the management server 40 via the network communication unit.

The print data transmission unit 45c of the management server 40, upon termination of the process of step S181, determines whether or not the apparatus-supported setting data has been received from the MFP that is the transmission destination of the print data (S182).

If it is determined in step S182 that the apparatus-supported setting data has been received from the MFP that is the transmission destination of the print data, the print data transmission unit 45c determines whether or not the MFP that is the transmission destination of the print data supports the sheet size indicated by the sheet size information of the print data to be transmitted, based on the received apparatus-supported setting data (S183).

If it is determined in step S183 that the transmission destination of the print data does not support the sheet size indicated by the sheet size information of the print data to be transmitted, the print data transmission unit 45c changes the sheet size information to indicate a "supported" sheet size that is included in the apparatus-supported setting data of the MFP (S184). For example, when sheet size information of the print data indicates an A3 size but the apparatus-supported setting data does not include an A3 size as a supported sheet size as illustrated in FIG. 5, the print data transmission unit 45c changes the sheet size information of this print data to indicate an A4 size, which is a supported sheet size as indicated by the apparatus-supported setting data of the MFP to which the print data is to be transmitted.

If it is determined in step S183 that the MFP that is the transmission destination of the print data supports the sheet size indicated by the sheet size information of the print data to be transmitted or when the process of step S184 is finished, the print data transmission unit 45c determines whether or not the MFP to which the print data is to be transmitted supports the color indicated by the color/black information of the print data to be transmitted, based on the received data of the apparatus-supported settings (S185).

If it is determined in step S185 that the MFP to which the print data is to be transmitted does not support the color indicated by the color/black information of the print data to be transmitted, the print data transmission unit 45c changes the color/black information of the print data to be transmitted to indicate a "supported" color that is included in the apparatus-supported setting data (S186). For example, when the color/black information indicates "color printing but the apparatus-supported setting data does not include "color" printing, as illustrated in FIG. 5, the print data transmission unit 45c changes the color/black information to indicate "monochrome" printing.

If it is determined in step S185 that the MFP that is the transmission destination of the print data supports the color indicated by the color/black information of the print data to be transmitted or when the process of step S186 is finished, the print data transmission unit 45c determines whether or not the MFP to which the print data is to be transmitted supports, based on the received data of the apparatus-supported settings, printing the number of copies indicated in the print data.

If it is determined in step S187 that the MFP that is the transmission destination of the print data does not support printing the number of copies indicated in the print data, the print data transmission unit 45c changes the print data to a number of individual print jobs equal to the indicated number of copies (S188). For example, when the print data includes image data and information indicating three printed copies, the print data transmission unit 45c changes this print data to three individual print jobs, each including a single copy of the print data.

If it is determined in step S187 that the MFP that is the transmission destination of the print data supports printing the indicated number of copies or when the process of step S188 is finished, the print data transmission unit 45c transmits the print data to the MFP that is the transmission destination via the network communication unit 43 (S189) and terminates the process illustrated in FIG. 14.

The MFP 20, upon receiving the print data from the management server 40 in step S189, performs the process illustrated in FIG. 10 and performs printing.

The MFP 30, upon receipt of the print data from the management server 40 in step S189, performs the process illustrated in FIG. 11 and performs printing.

As described above, when the apparatus-supported setting data of an MFP to which print data is to be transmitted from the management server 40 does not correspond to print attribute information included in this print data (No in step S183, No in step S185, No in step S187), the printing system 10 changes this print data to include attribute information corresponding to the apparatus-supported setting data (S184, S186, S188). As a result, in pull printing, a print result that is the same as the print result desired by the user or the print result alternative to the print result desired by the user is obtained.

Specifically, when print attribute information in the print data to be transmitted to an MFP from the management server 40 indicates a desired number of printed copies, even if the MFP does not support printing of the number of copies indicated by the print data (No in step S187), the printing system 10 changes this print data to a number of individual print jobs equal to the indicated number of copies (S188). As a result, the user obtains the desired output. Note that although the process for changing the original print data to a number of individual print jobs equal to the indicated number of copies is performed in the embodiment described above, the original print data may be controlled so as to be changed to a single print job by removing the information indicating the number of copies. However, in this case, it is preferable to control the display unit 22 of the MFP to display a message noting that the number of copies has been changed.

Even if an MFP does not support the sheet size indicated by the sheet size information of the print data that is to be transmitted from the management server 40 to the MFP (No in step S183), the printing system 10 changes this print data to indicate a supported sheet size (S184). As a result, the user obtains a modified print result as an alternative to the desired print. For example, in pull printing, the print data representing an A3-size recording medium cannot be printed by the MFP 30 that does not support the A3 size without the management server 40 changing the size from A3 to A4. However, in pull printing in the printing system 10, since the print data represented by A3-size is printed by the MFP 30 after the conversion process performed by the management server 40 (such as reduction of the A3-size printing data to A4-size printing data), A4-size output is obtained by the MFP 30.

Even when an MFP does not support the color indicated by the color/black information of the print data that is to be transmitted from the management server 40 to the MFP (No in step S185), the printing system 10 changes this print data to include color/black information indicating one of the colors supported by this MFP (S186). As a result, the user obtains a print result that is different from the print result desired in pull printing, i.e., a print output that uses a color that is different from the color desired. For example, in pull printing, when the image data of a yellow bar graph or text data of yellow text is printed by the MFP 30, the MFP 30 changes the color image to a monochrome image using a monochrome conversion function provided in the MFP 30. However, in this case, a monochrome print output may be obtained in which the bar graph or text is difficult to visualize due to unclear shading or a low black density. However, in pull printing in the printing system 10, the image data of the yellow bar graph or the text data of the yellow text is changed by the management server 40 to monochrome image data in which, for example, yellow is represented as non-shaded black, before printing is performed by the MFP 30. As a result, easy-to-read output is obtained in which a bar graph and text have clear shading or a high black density.

In the present embodiment, information indicating the number of copies, the sheet size, and the color, among the print attributes of print data, has been described as an example of the apparatus settings data that are not supported by an MFP. However, the apparatus settings data that are not supported by an MFP among the print attributes of print data may be print attribute information other than the information indicating the number of copies, the sheet size, and the color.

In the printing system 10, since the management server 40 obtains the data of apparatus-supported settings from an MFP as required (S181), a change in system configuration, for example, addition and deletion of an MFP and a change in the apparatus settings data supported by the MFP, may be easily handled. Note that when the printing system 10 employs a configuration in which the management server 40 stores the data of apparatus-supported settings of all the MFPs in the printing system 10, the management server 40 need not obtain the apparatus-supported setting data from the MFPs.

In the printing system 10, since the management server 40 automatically changes print data, a user operation for changing print data is not required. As a result, for example, a printing error due to a user's improper operation is prevented in the printing system 10.

As has been described above, the management server 40 changes print data in accordance with the apparatus settings data supported by an MFP to which the print data is transmitted. Since the management server 40 need not ask an MFP to change the print data in accordance with the apparatus settings data supported by the MFP, the configuration of the MFP need not be changed when the management server 40 is incorporated into an existing printing system including MFPs. As a result, the management server 40 can be easily incorporated into an existing printing system including MFPs.

While various aspects and embodiments have been disclosed herein, other aspects and embodiments are possible. Other designs may be used in which the above-described components are each present.

Although the management server 40 is configured to store print data in the printing system 10 of the present embodiment, a spool server for storing print data may be provided separately from the management server 40.

Although the printing system 10 of the present embodiment includes an MFP as an image forming apparatus of the present disclosure, an image forming apparatus other than an MFP, such as a printer, may be included.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. A printing system comprising:
    an image forming apparatus coupled to a network;
    a management server coupled to the network; and
    a print data transmission apparatus coupled to the network,
    wherein the print data transmission apparatus includes:
        a first print data transmission unit configured to transmit print data associated with a user to the management server, and wherein the image forming apparatus includes:
an authentication request unit configured to cause the management server to authenticate the user; and
a print execution unit, including apparatus-supported setting data, configured to print the print data transmitted from the management server, and wherein the management server includes:
a print data management unit configured to manage the print data transmitted from the print data transmission apparatus,
an authentication execution unit configured to authenticate the user, and
a second print data transmission unit configured to change the print data associated with the user to supported print data corresponding to the apparatus-supported setting data, and transmit the supported print data to the image forming apparatus, if the authentication of the user is successful,
wherein the second print data transmission unit is further configured to change the print data to supported print data including print attribute information corresponding to the apparatus-supported setting data if the apparatus-supported setting data does not correspond to the print attribute information included in the print data,
wherein the second print data transmission unit is further configured to change a specified color of image data in the print data to non-shaded black via a monochrome conversion, if the print attribute information includes color/black information and the apparatus-supported setting data does not correspond to the color/black information, and
wherein yellow image data and/or yellow text data are changed by the management server to monochrome image data in which yellow is represented as the non-shaded black, before printing is performed by the image forming apparatus, if the management server determines that the apparatus-supported setting data acquired from the image forming apparatus does not correspond to the color/black information referring to yellow.

2. The printing system according to claim 1, wherein the image forming apparatus further includes:
an apparatus-supported setting data management unit configured to manage the apparatus-supported setting data, and
wherein the second print data transmission unit is further configured to acquire the apparatus-supported setting data from the apparatus-supported setting data management unit.

3. The printing system according to claim 1, wherein:
the second print data transmission unit is further configured to change the print data to the supported print data to indicate a number of copies equal to a number of copies corresponding to the apparatus-supported setting data if the print attribute information includes first information indicating the number of copies and the apparatus-supported setting data does not correspond to the first information.

4. The printing system according to claim 1, wherein:
the second print data transmission unit is further configured to change the print data to the supported print data including a single copy of the print data by removing first information indicating the number of copies if the print attribute information includes the first information indicating the number of copies and the apparatus-supported setting data does not correspond to the first information.

5. The printing system according to claim 4, wherein:
the image forming apparatus further includes a display unit, and the display unit is configured to display a message that describes the number of copies to be changed.

6. The printing system according to claim 1, wherein: the second print data transmission unit is further configured to change the print data to the supported print data including sheet size information that is same as the sheet size information corresponding to the apparatus-supported setting data if the print attribute information includes second information indicating sheet size information and the apparatus-supported setting data does not correspond to the second information.

7. The printing system according to claim 6, wherein:
the second print data transmission unit further configured to reduce the print data if a sheet size of the sheet size information corresponding to the apparatus-supported setting data is smaller than the sheet size corresponding to the second information.

8. The printing system according to claim 7, wherein:
the image forming apparatus further includes a display unit, and the display unit is configured to display a message that describes the print data to be reduced.

9. A method of printing performed by a printing system that includes an image forming apparatus coupled to a network, a management server coupled to the network, and a print data transmission apparatus coupled to the network, the method comprising:
via the print data transmission apparatus:
transmitting print data to the management server in association with a user,
via the image forming apparatus including apparatus-supported setting data:
causing the management server to authenticate the user; and
printing the print data transmitted from the management server,
via the management server:
managing the print data transmitted from the print data transmission apparatus;
performing authentication of the user;
changing, if the authentication of the user is successful, the print data associated with the user to supported print data corresponding to the apparatus-supported setting data; and
transmitting the supported print data to the image forming apparatus; and
changing, if the apparatus-supported setting data of the image forming apparatus does not correspond to print attribute information included in the print data, the print data to the supported print data that includes the print attribute information corresponding to the apparatus-supported setting data,
wherein, if the print attribute information includes color/black information and the apparatus-supported setting data does not correspond to the color/black information, a specified color of image data in the print data is changed to non-shaded black via a monochrome conversion, and
wherein yellow image data and/or yellow text data are changed by the management server to monochrome image data in which yellow is represented as the non-shaded black, before printing is performed by the image forming apparatus, if the management server determines that the apparatus-supported setting data acquired from the image forming apparatus does not correspond to the color/black information referring to yellow.

10. The method according to claim 9, further comprising:
via the management server:
acquiring the apparatus-supported setting data from the image forming apparatus.

11. The method of printing according to claim 9, further comprising:
via the management server:
changing, if the print attribute information includes first information indicating a number of copies and the apparatus-supported setting data does not correspond to the first information, the print data to the supported print data to indicate the number of copies equal to the number of copies corresponding to the apparatus-supported setting data.

12. The method of printing according to claim 9, further comprising:
via the management server:
changing, when the print attribute information includes second information indicating sheet size information and the apparatus-supported setting data does not correspond to the second information, the print data to the supported print data including the sheet size information that is same as the sheet size information corresponding to the apparatus-supported setting data.

13. The method of printing according to claim 9, wherein:
the management server is a computer.

14. The method of printing according to claim 9, wherein:
the print data transmission apparatus is a computer.

15. The method of printing according to claim 9, wherein:
the image forming apparatus comprises a multifunction peripheral (MFP).

* * * * *